July 3, 1962  H. E. JACKSON  3,042,571
IMPROVED METHOD OF BONDING FILTER ELEMENTS
Filed Sept. 5, 1958  2 Sheets-Sheet 1

INVENTOR
Harold Ernest Jackson
BY
Robert P. Walton Jr.
ATTORNEY

July 3, 1962  H. E. JACKSON  3,042,571
IMPROVED METHOD OF BONDING FILTER ELEMENTS
Filed Sept. 5, 1958  2 Sheets-Sheet 2
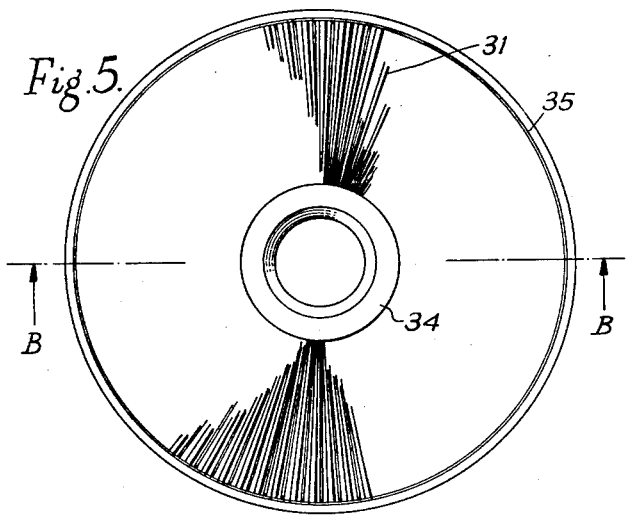
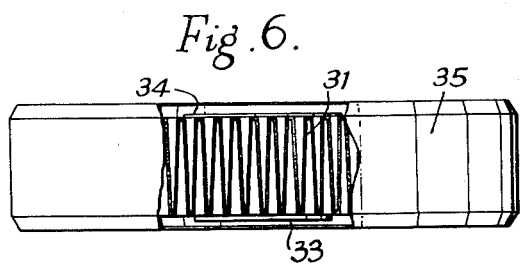
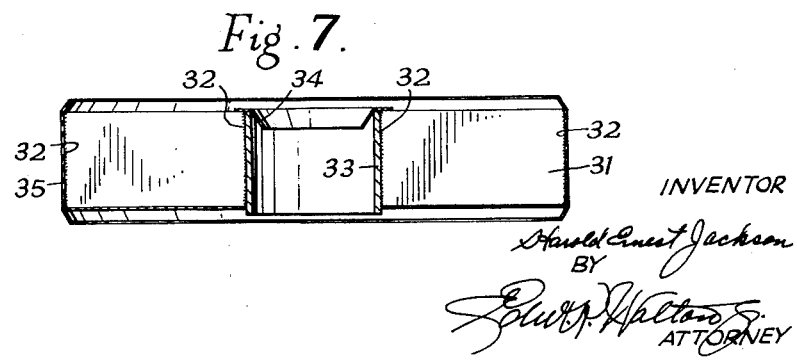
INVENTOR
Harold Ernest Jackson
BY
ATTORNEY

United States Patent Office 3,042,571
Patented July 3, 1962

3,042,571
IMPROVED METHOD OF BONDING FILTER ELEMENTS
Harold Ernest Jackson, Plympton St. Maurice, England, assignor to Tecalemit Limited, Brentford, England
Filed Sept. 5, 1958, Ser. No. 759,167
13 Claims. (Cl. 156—191)

This invention relates to the construction of filter elements and it is more particularly concerned with the construction of elements of the type in which the filter element consists of one or more sheets of filter material which is or are pleated, folded or otherwise formed into an annular or other required shape and one or more of the edges of which is or are secured to at least one end cap or other member, which holds the filter material in position and prevents the flow of fluid round, instead of through, it. Such filters include, inter alia, those of the star type, in which a sheet of filter material is pleated and secured in the form of an annular "star" (in cross-section) between a pair of annular end caps to form the filter element, and those comprising one or more cylinders or a helix of filter material, which is or are secured between a similar pair of end caps to form the filter element.

Another form of filter, to which the invention is applicable, is one in which a strip of filter material is pleated along transverse fold lines and is then arranged in a fan-like manner to form an annular element of a more or less disc-like form, in which the pleats radiate from the centre. In this latter form of filter element, the edges of the filter material may be secured to an inner tube and also to an outer sealing band, which parts may be made of paper or other suitable material, to retain the shape of the element and to control the passage of the fluid through the filter material, from one side of the filter element to the other.

When constructing filter elements in which the filter material, in pleated or other form, is fitted between a pair of end caps, one prior method which has been employed for securing the edges of the material to the end caps consists in applying a liquid adhesive or cement to the inner surface of each end cap, after which the ends of the filter material are pressed against the film or layer of adhesive or cement, which secures the parts together.

Such known methods for securing the end caps of filter elements suffer from various drawbacks and difficulties, particularly when it is necessary to ensure the provision of an effective leak-proof bond under conditions of large scale production. Under such conditions, it is normally necessary for mass production, in order to provide a margin of safety, to utilise a larger quantity of adhesive or cement on the inner faces of the end caps than is strictly necessary to provide an adequate bond which is uneconomical and the excess flows onto the surfaces of the filter material, thus reducing its filter area and the effectiveness of the latter. Another difficulty is due to the risk of air being entrained when the filter material is being embedded in the liquid adhesive or cement, with the resultant possibility that air bubbles formed may cause the bond to leak. Furthermore, it has been proposed to apply lengths of pre-formed tapes at and embracing around the edges of a strip of filter material, these tapes being composed of a solidified cellulose or resinous substance which may be dissolved or softened by a solvent to cause them to be adhesive. This requires the extra-step or steps of making the sheet material of such substances, of cutting the sheet into tapes of required width to embrace around the edges of the filter material, of rolling these tapes onto the edges of the filter material; and the width of such tapes provides a wasteful excess of non-useful adhesive substance with its attendant drawback of fouling the filter material when so dissolved to render it adhesive to the end-caps of the filter element.

It is accordingly one of the principal objects of the present invention to provide a new method for manufacturing filter elements in which, broadly, a soft adhesive substance is applied directly as a small bead to and along the edges of the filter material and is thereafter bonded to end caps or other members devoid of an adhesive, thereby overcoming the above mentioned drawbacks and difficulties and providing the most economical, efficient and reliable manner of assembling a unitary filter element with a minimum of adhesive by having no adhesive on the end-caps or other surfaces except only at the points of bonded contact of the filter material therewith.

Another object of the present invention is, more specifically, to provide a method of bonding a filtering material in sheet form to an adjoining member in the construction of a filter element unit, wherein a bead of an adhesive substance is first formed along an edge or a fold-line of the filter material or medium by applying said substance along said edge or fold-line while the substance is in a liquid, semi-liquid or plastic state, after which the substance is allowed to harden so that the filter material can be handled, folded or otherwise manipulated into form in the mass production of said filter element units; and wherein the said formed filter material is then attached to an adjoining member or members (such as end caps or inner and outer bands or tubes), having no adhesive substance thereon, by pressing said bead against the said adjoining member or members while causing a softening of the bead followed by a rehardening of the latter which causes the filter material to adhere to said member or members.

A further object of the invention is to provide a method of forming a filter element comprising at least one band or strip of a filter material which is rolled or folded into a helical, annular or zig-zag form and one edge at least of which is secured to an end cap or other member to support the filter material and prevent the flow of fluid between it and the said member, wherein the edge of the strip is secured to the said member by the above method.

The invention will now be more fully described, by way of example, with reference to the accompanying drawings, in which:

FIGURE 5 is a plan view showing another form of filter element which may be constructed in accordance with the invention;

FIGURE 6 is a partly cut away side view of the element shown in FIGURE 5; and

FIGURE 7 is a section taken on the line B—B of FIGURE 5.

Figure 1:
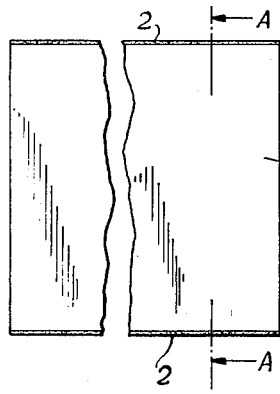
FIGURE 1 is a plan view, partly cut-away, showing a length or strip of a filter material which may be used in the construction of a filter element according to the invention.
Figure 2:
FIGURE 2 is a section, taken through the filter material on the line A—A of FIGURE 1.
Figure 3:
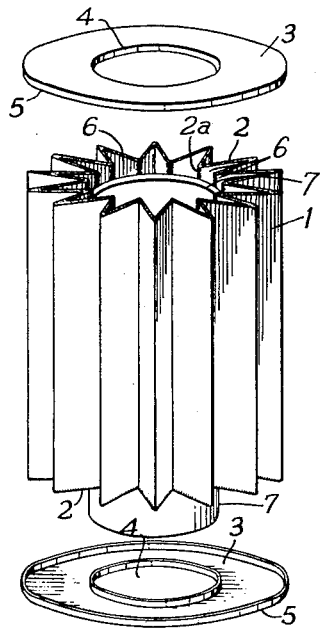
FIGURE 3 is a general view showing one form of filter element exemplifying the invention, before its final assembly.

Referring first to FIGURES 1, 2 and 3, the filter element shown is constructed from a length or strip of filter paper or other filtering medium 1. The two longitudinal side edges of this strip are formed with beads 2 made of a suitable adhesive or bonding substance. This substance may be one which can be applied to the edges of the strip in a liquid, semi-liquid or plastic state, after which it can be allowed or caused to harden. Thus, the adhesive substance may be one which can be melted or softened by heat, such as nylon or polythene or another thermoplastic synthetic resin having the required properties, or alternatively an adhesive substance may be used which is rendered liquid or plastic by the inclusion in it of a solvent. Examples of suitable adhesives or bonding agents, which may be inorganic and/or organic of natural or synthetic origin, are known and sold under the registered trademarks "Bostik" and "Pliobond" and include various synthetic resins which are rendered liquid or semi-liquid by the inclusion in them of suitable volatile solvents. It is also possible to make use of natural or synthetic rubber latex and of suitable adhesives having a starch base.

The adhesive or bonding substance may be applied to the edges of the strip 1 to form the beads 2 in any suitable manner. For example, the edges of the strip 1 may be dipped in the adhesive or bonding substance in liquid form or said edges may be passed over a roller or other suitable member coated with the substance. Alternatively, the adhesive or bonding substance may be applied by extrusion, as in a continuous cohesive stream-mass or in a nebulized spray.

Whichever method of application is used, the adhesive or bonding substance is then caused or allowed to harden on the strip 1 to form the beads 2, which facilitates the subsequent handling and manipulation of the strip 1 in the construction of the filter element resulting in the production of a tubular band of filter material having continuous beads of a hardened adhesive or bonding substance in solid form along its end edges and which will not interfere with the handling and manipulation of the band before and during the assembly of the filter element.

To form the filter element shown in FIGURE 3, the strip 1 of filter material with the beads 2 along its side edges is pleated along substantially parallel and spaced fold-lines transverse to its length and is folded to form a pleated annulus, as shown, in FIGURE 3, the two ends of the strip being secured together in any suitable way to form a tubular band using, if desired, the same adhesive or bonding substance as has been used to form the beads 2. Such a substance may, in fact, be initially applied to the ends of the strip 1 to form beads on the latter similar to the beads 2 on its side edges. The strip 1 of filter material, having been so formed and the adhesive 2 thereon being dry and solid, may be, and sometimes is, stored for subsequent assembling into a completed filter element.

Thereafter to complete the filter element, holding and fluid directing means in the form of a pair of annular end caps 3, which are shown as having inner and outer lips or rims 4 and 5, are applied to the ends, respectively, of the pleated tubular filter material or member. These caps may be formed of any suitable material, including sheet metal (which may be pressed to shape), cardboard (which may be pressed or moulded to shape) and synthetic plastics (which may be moulded to shape).

To assemble the filter element into a unitary structure, the tubular pleated filter material 1 with its bead 2 is fitted between the two end caps 3 and pressure is applied to the latter. If a thermoplatic substance is used for the beads 2, sufficient heat is applied to soften this substance and to cause it to adhere to the caps 3. Alternatively, a solvent may be used to soften the adhesive.

After cooling or the evaporation of the solvent to cause the adhesive substance to harden, the pressure can be released and the end caps 3 will remain firmly attached to the filter material. Since the beads 2 formed along the edges were continuous, there is no likelihood of any gaps occurring in the bonding of the end caps, which might allow leakage of the fluid being filtered round the edges of the filter material.

Figure 4:
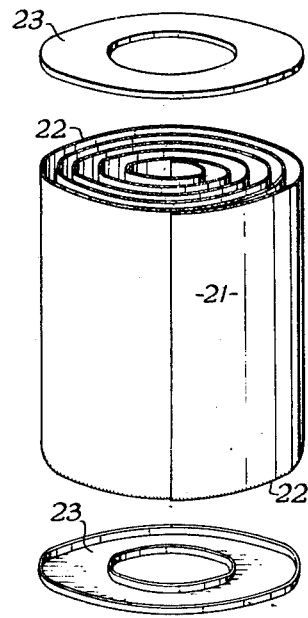
FIGURE 4 is a view similar to FIGURE 3 but showing a modified form of filter element.

FIGURE 4 shows another form of a filter element, in which a strip 21 of filter material having beads 22 (similar to the beads 2), instead of being pleated, is wound into the form of a helix. The inner and outer ends of the band are secured to the adjacent turns or convolutions of the helix in order to form inner and outer cylinders of filter material.

The helix of filter material 21, shown in FIGURE 4, is fitted between and is secured to a pair of end caps 23 (similar to the caps 3) by any of the methods which have been described with reference to FIGURE 1.

Similar methods may also be employed, if a band or bands of filter material is or are used which is or are simply formed into one or more concentric cylinders by connecting the ends of the or each band together but provided with the beads 2 or 22 of the aforesaid bonding material.

Any of the filters which have been described can also include other holding and fluid directing means in the form of an inner tube 7 (FIG. 3) made of perforated metal or of any other suitable material through which the fluid being filtered can pass and such a tube may be secured to the end caps 3 or 23 in the same way as the filter element 1 or 21 if beads of the adhesive or bonding substance are first formed round the edges of the tube at the ends of the latter.

Furthermore, in the filters which have been described, a metal mesh or other suitable support may be provided for the filter material and, again, a similar method may be employed for securing such a support to the end caps by means of beads of adhesive formed along the edges of the material used for the support.

FIGURES 5 to 7 show another form of filter element of the general kind which comprises a strip of filter material 31, similar to that shown in FIGURES 1 and 2, having edge beads 32 of adhesive, similar to the beads 2 or 22, which is first pleated along spaced transverse fold lines and its ends are secured together. This forms a pleated tubular filter element which appears somewhat similar to the element 1 shown in FIGURE 3. In the present case, however, in order to form the filter element 31, one end of the thus formed, pleated tube-form is opened and/or spread outwardly so that the material takes the form of a pleated annular disc with the fold lines of the pleats at the other or inner end grouped closer together and radiating outwardly from the centre in the manner of a fan. In this form of a filter element, a holding and fluid directing means may be employed in the form of an impervious central tube 33 and an outer surrounding impervious band, sleeve or ring 35. The central tube 33, which may be made of paper, card, metal or suitable material, is fitted inside the annulus and is secured to the inner beaded edge 32 of the pleated filter material by the use of heat or a solvent, which softens the adhesive bead 32 on that edge. The tube 33 may be formed with a flange at one end, if desired, or a separate flanged sealing ring 34 may be inserted, being secured by any suitable adhesive which may or may not be the same as that used for the beads 32. The band 35 surrounds filter element and contacts the adhesive bearing outer edges thereof. This band, sleeve or ring 35 may consist of a ring of an elastic material, such as natural or synthetic rubber; and, alternatively, it may be provided by a strip of paper or other material, which may not be elastic and which is fitted or wound round the filter elements.

Whichever method is employed, if the outer edge of the pleated filter material 31 has been provided with a bead of an adhesive substance 32, similar to the inner bead 32, this may be used to secure the outer ring or band 35 in position by one of the methods which has been described, this preferably being done at the same time as the attachment of the inner bead to the central tube.

Although the present invention has been more particularly described as applied to the attachment of the edges of the filter material to end caps or other members, the same principle may be employed in cases in which it may be desired to secure the fold lines of a folded or pleated filter material to an adjacent part, such as the inner fold lines 6 of the filter material 1 of FIGURE 3, to and along which fold lines 6 a bead 2a of said thermoplastic or solvent-plastic adhesive in liquid form is deposited, in order that an inner central tube 7 may be secured thereto. The necessary beads 2a of the adhesive or bonding substance are applied to the folds 6, after the forming of the pleats, by any suitable one of the methods which have been described.

Having thus described the invention and the manner in which the same is to be performed and constructed, it is to be understood that changes and modifications may be made in detail construction of parts and in specific arrangement of parts shown and described and that such changes as fall within the scope of the appended claims are within the purview of the present invention and contemplated thereby.

That which is claimed, as new and to be secured by Letters Patent, is:

1. A method of bonding a filter material in sheet form to an adjoining holding means in the construction of a filter element unit, which method comprises first forming a bead of an adhesive substance on at least one end edge of a filter sheet by depositing said adhesive substance along said edge, while the adhesive is in a soft state and allowing said bead to dry and harden so that the filter sheet may be handled and manipulated into the form of a filtering element; then, shaping said sheet into a circular form; then applying a holding means devoid of adhesive thereon to the bead of adhesive of said edge of said filter sheet and subjecting said bead to a softening step and, while so softened, pressing said bead against said adjoining holding means; and then subjecting said bead to a rehardening step to cause the edges of the filter material to be bonded to said means.

2. A method as claimed in claim 1, wherein the adhesive is a thermoplastic substance which is subsequently softened by heat to cause it to adhere to the said holding means.

3. A method as claimed in claim 1, wherein the adhesive contains a solvent the evaporation of which causes the adhesive to harden after being applied to the filter material to form the bead; and wherein the adhesive is subsequently softened by the application of a solvent thereto to cause it to adhere to the said holding means.

4. A method as set forth in claim 1, wherein the bead is formed by dipping the edge or fold line of the filter sheet in a liquid adhesive substance.

5. A method as set forth in claim 1, wherein the adhesive substance is applied to the filter material by moving said edge thereof over a member carrying the adhesive substance in liquid form.

6. A method as set forth in claim 1, wherein the bead is formed by extruding said adhesive in a continuous mass onto said edge of the filter material.

7. A method as claimed in claim 1, wherein the adhesive substance is sprayed onto said edge of the filter material to form said bead thereon.

8. A method of forming a filter element as set forth in claim 1, further characterized by the shaping step comprising the coiling of said sheet of filter material into a helical-form with spaced convolutions; and by the holding means being an annular end-cap and the bonding step including the capping of the ends of the helical-form with annular caps pressed against said beads, whereby the end edges of said helical-form are secured to said end-caps.

9. A method of forming a filter element as set forth in claim 1, further characterized by folding said sheet of filter material to form a multiplicity of substantially adjacent pleats and applying a bead of a soft adhesive substance continuously along the outwardly projecting edges of said folds on one surface of said sheet and allowing said adhesive to harden; and by said shaping step including the bringing of said sheet into a cylindrical-annular form with the pleats extending axially of said form and with the adhesive-bearing fold-edges extending inwardly of said form; and by said holding means being annular end-caps for the ends of said form and a tube inserted in the center opening of said form; and by the bonding step including the capping of the ends of the annular form with a pair of end-caps pressed against said softened beads of adhesive substance on opposite ends of said form and the softened adhesive on the fold-edges of the pleats being pressed against said tube.

10. A method of fabricating a filter element unit which comprises providing an elongated sheet of filtering material with a continuous bead of hardened unpolymerized adhesive substance along each of its two opposite side edges; then pleating said sheet along substantially parallel and spaced lines extending transversely of the sheet between the beads on its side edges; then applying a bead of said adhesive in a softened condition to and along each outer fold-line on one face of said sheet and allowing the said beads to harden; then shaping said pleated sheet into a cylindrical-annulus with its meeting edges secured together and with said adhesive bearing fold-lines projecting inwardly of said cylindrical-annulus and the beads on said side edges being at the ends of said pleated cylindrical-annulus; inserting a tubular member centrally into said pleated cylindrical-annulus in opposing relation to the adhesive substance on the inner fold-lines of said pleats; applying annular end caps to the ends of said pleated cylindrical-annulus; and then subjecting said adhesive material on the ends of said pleated cylindrical-annulus and on the inner fold-lines of said pleats to a softening step while pressing said end caps against the beads on the ends of said pleated cylindrical-annulus and pressing said adhesive-coated fold-lines of the pleats against said inserted central tube; and then allowing said adhesive material to reharden, whereby securing said parts together with a continuous bond in a filter element unit.

11. A method of fabricating a filter element unit which comprises providing an elongated sheet of filtering material and applying a continuous bead of an adhesive substance along at least one of its longitudinal edges while the adhesive is in a soft state and allowing said beads to harden; then pleating said sheet transversely of its length; then shaping said pleated sheet into an annular disc-like form with the longitudinal length of said pleats radiating outwardly from its center and its meeting ends secured together and with said bead of adhesive at its inner diameter; inserting a tubular member into the center opening of said annular disc-like form in contact with the bead of adhesive substance at its inner edge; and subjecting said bead of adhesive material to a softening step while pressing said softened adhesive bead against said inserted central tube; and then allowing said adhesive material to reharden to secure the parts together with a continuous bond.

12. A method of fabricating a filter element unit which comprises providing an elongated sheet of filtering material and applying a continuous bead of an adhesive substance along each of its two longitudinal edges while the adhesive is in a flowable state and allowing said beads to harden; then pleating said sheet transversely of its length; then shaping said pleated sheet into an annular disc-like form with the longitudinal length of its said pleats radiating outwardly from its center and with its meeting end edges secured together; inserting a tubular member into the center opening of said annular disc-like form in contact with the bead of adhesive substance at the inner edge of said annular disc-like form and surrounding the outer edge of said pleated disc-like form with an enclosing band-strip; and subjecting said beads of adhesive material on the edges of said pleated disc-like form to a softening step while pressing said beads against said tubular member and said enclosing band-strip; and then allowing said adhesive material to reharden to secure the parts together with a continuous bond.

13. A method of fabricating a filter element unit which includes pleating an elongated sheet of filtering material transversely of its length; applying a bead of a soft adhesive substance continuously along the outer folded edges of the pleats projecting from one surface of said sheet and allowing said adhesive to harden; then bringing and securing together the opposite end edges of said pleated sheet to form a cylindrical-annulus with said adhesive bearing fold-lines of the pleats projecting inwardly of said annulus; then inserting a tubular member centrally into said pleated annulus in opposing relation to said adhesive bearing fold-lines; then subjecting said adhesive material to a softening step while pressing said adhesive bearing fold-lines against said inserted central tube; and then allowing said adhesive material to re-harden, whereby securing said parts together with a continuous bond.

References Cited in the file of this patent

UNITED STATES PATENTS

| | | | |
|---|---|---|---|
| 2,101,607 | Block | Dec. 7, | 1937 |
| 2,313,750 | Hothersall | Mar. 16, | 1943 |
| 2,344,488 | Bowling | Mar. 21, | 1944 |
| 2,663,660 | Layte | Dec. 22, | 1953 |
| 2,726,184 | Cox | Dec. 6, | 1955 |
| 2,739,916 | Parker | Mar. 27, | 1956 |
| 2,749,265 | Fricke | June 5, | 1956 |
| 2,801,009 | Bowers | July 30, | 1957 |

FOREIGN PATENTS

| | | | |
|---|---|---|---|
| 655,223 | Germany | Jan. 11, | 1938 |